Patented Aug. 22, 1950

2,519,442

UNITED STATES PATENT OFFICE 2,519,442

COMPOSITIONS CONTAINING CELLULOSIC FILLER UNITED BY POLYVINYL CHLORIDE

Jean Delorme, Bron, and Georges Desthieux, Lyon, France, assignors to Societe Anonyme des Manufactures des Glaces et Produits Chimiques de Saint-Gobain, Chauny & Cirey, Paris, France No Drawing. Application May 26, 1945, Serial No. 596,108. In France April 28, 1944

Section 1, Public Law 690, August 8, 1946
Patent expires April 28, 1964

3 Claims. (Cl. 260—17.4)

Our invention relates to a method for agglomerating granulated or pulverulent substances with a binder containing polyvinyl chloride or its co-polymers having a high percentage of polyvinyl chloride.

It has already been proposed to incorporate a plasticizer or a softening agent in the binder and to mix under heat the pulverulent substance with said binder. Such process requires the use of important quantities of the binder containing the plasticizer or softening agent, in order to suitably imbibe the pulverulent substance; the proportion of binder in the resulting product is thus much higher than that of the material to be agglomerated. In such a case the pulverulent substance constitutes really a filler incorporated in the vinyl resin.

We found—and this is the subject of our present invention—that it is possible to agglomerate granulated or pulverulent substances and to obtain products having good mechanical properties, though the quantity in weight of the binder be lower than that of the substance to be agglomerated. According to our invention the polyvinyl chloride or the co-polymer containing polyvinyl chloride is mixed in the pulverulent form without heating with the pulverulent or granulated substance to be agglomerated.

Such mixing enables to obtain a perfect distribution of the resin through the material to be bound, and the agglomeration is then accomplished by compression under heat at a temperature sufficient to cause the softening of the resin and its penetration into the particles to be bound.

When it is desired to get agglomerated products having a certain flexibility, plasticizers may be added. Their addition may take place after the pulverulent substance is intimately mixed with the resin.

We found that the homogeneity of the resulting products is still better when the chosen plasticizers are in the solid state, i. e. if the plasticizer also is added as a powder to the intimate mixture of powdered resin with the pulverulent or granulated substance to be agglomerated. According to one of the methods for carrying out the invention, the plasticizers will thus be preferably chosen among those which are solid at the temperature at which the mixture is effected. For instance the following plasticizers may be used, either alone or in mixtures: camphor, triphenylphosphate, benzyl cinnamate, cyclohexyl oxalate, cyclohexyl adipate, dibenzyl phthalate, acetophenone, or mixtures such as camphor-thymol, camphor-diphenylamine, eventually used with other plasticizers.

According to another form of carrying out the invention, the plasticizers which are liquid or viscous at ambient temperature may be suitably cooled until they become solid, before being introduced in the mixture.

Among the known plasticizers solid at the ambient temperature, which may be used, it is advisable to choose plasticizers which will improve the adherence of the polyvinyl chloride. Thus camphor, fenchone, terpenoid ketones in general, their isomers, their substitution derivatives or the intermediary products of their manufacture, may be used as well as phthalic esters or esters of hydroaromatic alcohols, such substances being used separately or in combination.

In case the plasticizer is constituted by a combination of those substances, the elements of the combination may be separately introduced into the mixture.

We also found that, in some cases, the constituents of the powder to be agglomerated may be utilized and made to participate in the intimate union of agglomerated substances. For instance, for agglomerating a flour of a resinous wood (pinaster wood, for example) a very intimate plasticization may be achieved due to the fact that the mixture of camphor, fenchone, etc. with an organic acid such as colophony (impure abietic acid) constitutes an excellent plasticizer of polyvinyl chloride. The plasticizing effect, in that case, is obtained by merely adding camphor, fenchone or other analogous products to the wood flour.

The process according to the invention produces various kinds of agglomerates with relatively low proportions of binder, namely inferior to 50% in weight, in the case of the agglomeration of granulated or pulverulent substances.

It permits the agglomeration of all the most different granulated or pulverulent substances of mineral, vegetal or animal origin.

The agglomerated sheets obtained according to our invention may be united, for example by pressing or sticking, with a support of fabrics, papers, plastics or other materials to form composite sheets in which the support may be applied to one or both faces, or may be an intermediate layer.

The following examples, though not limitative, illustrate different ways of carrying out the invention:

In those examples, the word "parts" must be understood as meaning "parts in weight."

*Example 1*

160 parts of flour of resinous wood (pinaster), and 60 parts of polyvinyl chloride in fine powder are intimately mixed in a mixing apparatus. 20 parts of finely powdered camphor are then poured into the apparatus and mixed during about 20 minutes in order to suitably distribute the camphor in the whole mass.

The agglomeration takes place afterwards on heated rollers at a temperature of about 130–140° C.

Camphor combines with the colophony contained in the wood, the resulting product being a plasticizer of the polyvinyl chloride. All the intervening elements are thus bound up to the inside itself of the wood particles.

The pieces or sheets withdrawn from the rollers may be thus piled in a mould and compressed under heat, at about 140° C. under a pressure of 50 to 250 kg./sq. cm. The resulting molded masses constitute artificial wood.

The hardness of such artificial wood may be controlled by decreasing the percentage of binder, the latter may be decreased down to 30 parts of polyvinyl chloride and 10 parts of camphor for 160 parts of flour of pinaster wood.

*Example 2*

When operating as stated for Example 1, 160 parts of lignin may be agglomerated with 60 parts of polyvinyl chloride and 20 parts of fenchone.

In that case, fenchone partially combines with the phenolic groups of the lignon, and a kind of internal plasticizer of the polyvinyl chloride is thus formed, still increasing the intimate union of the components and their homogeneity.

*Example 3*

160 parts of cork in powder or preferably in grains passing through a 20 mesh screen and 60 parts of polyvinyl chloride in the state of copolymer with polyvinyl acetate (proportion 90:10) are mixed in a mixing machine. When the mixture is performed, 10 parts of camphor, 10 parts of methylcyclohexyl phthalate and finally 20 parts of fenchone previously cooled so as to bring it to a solid state, are added to the mixture, a mixing operation taking place after the introduction of each of these products.

After the mixture is achieved, the agglomeration takes place on the rolling machine and sheets are withdrawn which may be calendered under heat and at the same time may be united by the calender to a support of fabric, paper or other sheet material to form composite sheets usable for manufacturing inside soles for shoes, slippers, etc.

Such cork agglomerated sheets united by the calender with a parchment paper paraffined on its face which is not in contact with the cork may give composite materials for manufacturing flask joints.

It must be noted that the presence of camphor, fenchone or other analogous product imparts remarkable antiseptic qualities to the articles containing same, and this is especially valuable for materials used for sanitary purposes.

*Example 4*

To 160 parts of cork are successively added 60 parts of polyvinyl chloride, 20 parts of camphor and, after intimate mixture, 20 parts of pure cyclohexyl phthalate.

All these products are solid. The cyclohexyl phthalate liquifies camphor, especially if the mixture is heated to about 40–50° C.; such binary mixture causes the gelatinization of the polyvinyl chloride and the agglomeration of the cork.

The agglomeration is completed on the rolling machine; the product is reduced into noddles and filled in a mould. Cork agglomerates may be thus obtained for very different applications: sound or heat insulation, floaters resistant to seawater, corks for carboys, panels, etc.

What is claimed is:

1. Shoe findings and compositions of like constitution comprising a cork and polyvinyl chloride agglomerate united by the polyvinyl chloride to a support of sheet material, the polyvinyl chloride being present in an amount materially less than the cork.

2. Shoe findings and compositions of like constitution having as basic ingredients cork, camphor and polyvinyl chloride.

3. Artificial wood having as its basic ingredients pinaster wood floor and at least 30 parts polyvinyl chloride, and 10 parts camphor, for each 160 parts pinaster wood flour.

JEAN DELORME.
GEORGES DESTHIEUX.

REFERENCES CITED

The following references are of record in the file of this patent:

UNITED STATES PATENTS

| Number | Name | Date |
|---|---|---|
| 2,118,017 | Safford | May 17, 1938 |
| 2,317,960 | Sayre | Apr. 27, 1943 |
| 2,327,846 | Kistler | Aug. 24, 1943 |

FOREIGN PATENTS

| Number | Country | Date |
|---|---|---|
| 470,380 | Great Britain | Aug. 13, 1937 |
| 575,939 | Great Britain | Feb. 15, 1946 |

OTHER REFERENCES

Page 48, Webster's New International Dictionary, second edition.

Certificate of Correction

Patent No. 2,519,442                                          August 22, 1950

JEAN DELORME ET AL.

It is hereby certified that error appears in the printed specification of the above numbered patent requiring correction as follows:

Column 3, line 44, for "lignon" read *lignin*; column 4, list of references cited, under the heading "Foreign Patents," for the patent number "575,939" read *575,393*;

and that the said Letters Patent should be read as corrected above, so that the same may conform to the record of the case in the Patent Office.

Signed and sealed this 14th day of November, A. D. 1950.

[SEAL]

THOMAS F. MURPHY,
*Assistant Commissioner of Patents.*